(12) United States Patent
Collins et al.

(10) Patent No.: US 11,408,210 B2
(45) Date of Patent: Aug. 9, 2022

(54) PIN LATCH WITH ADJUSTABLE PRE-LOAD

(71) Applicant: HARTWELL CORPORATION, Placentia, CA (US)

(72) Inventors: Brody Wayne Collins, Irvine, CA (US); Bo D. Artin, Placentia, CA (US)

(73) Assignee: Hartwell Corporation, Placentia, CA (US)

( * ) Notice: Subject to any disclaimer, the term of this patent is extended or adjusted under 35 U.S.C. 154(b) by 834 days.

(21) Appl. No.: 16/249,971

(22) Filed: Jan. 17, 2019

(65) Prior Publication Data

US 2019/0218837 A1    Jul. 18, 2019

Related U.S. Application Data

(60) Provisional application No. 62/752,055, filed on Oct. 29, 2018, provisional application No. 62/618,430, filed on Jan. 17, 2018.

(51) Int. Cl.
| | |
|---|---|
| *E05C 1/12* | (2006.01) |
| *E05C 1/06* | (2006.01) |
| *E05B 65/08* | (2006.01) |
| *B64D 29/06* | (2006.01) |
| *B64C 1/14* | (2006.01) |

(Continued)

(52) U.S. Cl.
CPC .................. *E05C 1/12* (2013.01); *B64C 1/14* (2013.01); *B64D 29/06* (2013.01); *E05B 15/0086* (2013.01); *E05B 65/0817* (2013.01); *E05C 1/06* (2013.01); *E05C 19/14* (2013.01); *E05C 19/145* (2013.01); *E05Y 2900/502* (2013.01)

(58) Field of Classification Search
CPC ..... E05C 1/00; E05C 1/08; E05C 1/12; E05C 1/085; E05C 1/02; E05C 1/06; E05C 1/065; E05C 3/006; E05C 19/14; E05C 19/145; B64C 1/14; E05B 15/0086; E05B 65/0817; E05Y 2900/502; Y10T 292/216; Y10T 292/0969; Y10T 292/0994; Y10T 292/1015; Y10T 292/102; Y10S 292/49
See application file for complete search history.

(56) References Cited

U.S. PATENT DOCUMENTS

| | | |
|---|---|---|
| 2,874,986 A | 2/1959 | Henrichs |
| 2,927,812 A | 3/1960 | Smith et al. |

(Continued)

FOREIGN PATENT DOCUMENTS

GB     2222432 A   *   3/1990   ............... E05C 3/08

OTHER PUBLICATIONS

Search Report & Written Opinion issued in Int'l App. No. PCT/US2019/013899 (2019).

*Primary Examiner* — Christine M Mills
*Assistant Examiner* — Peter H Watson
(74) *Attorney, Agent, or Firm* — Barnes & Thornburg LLP

(57) ABSTRACT

A latch mechanism includes a handle connected to a pin by a linkage. The linkage converts rotation of the handle relative to a frame into axial movement of the pin between extended and retracted positions relative to the frame. The pin engages with a pre-load adjustment mechanism in the extended position to apply a pre-load through the linkage that biases the pin toward the extended position. The pre-load adjustment mechanism is adjustable to set the pre-load through the linkage to a predetermined value as selected by a user.

19 Claims, 13 Drawing Sheets

(51) Int. Cl.
    *E05B 15/00*     (2006.01)
    *E05C 19/14*     (2006.01)

(56) References Cited

U.S. PATENT DOCUMENTS

| | | | |
|---|---|---|---|
| 3,628,817 A * | 12/1971 | Sheahan | E05C 19/14 |
| | | | 292/247 |
| 4,099,751 A * | 7/1978 | Poe | E05C 1/065 |
| | | | 292/139 |
| 4,130,307 A | 12/1978 | Poe et al. | |
| 4,826,221 A | 5/1989 | Harmon | |
| 4,828,299 A | 5/1989 | Poe | |
| 4,911,485 A | 3/1990 | Wasilewski | |
| 5,620,212 A * | 4/1997 | Bourne | B64D 29/06 |
| | | | 292/113 |
| 6,343,815 B1 * | 2/2002 | Poe | E05C 19/145 |
| | | | 292/113 |
| 7,185,926 B2 | 3/2007 | Helsely et al. | |
| 7,252,311 B2 | 8/2007 | Pratt et al. | |
| 2006/0214431 A1 * | 9/2006 | Helsley | B64D 29/06 |
| | | | 292/113 |
| 2013/0140832 A1 * | 6/2013 | Do | E05B 65/0817 |
| | | | 292/177 |
| 2016/0298367 A1 * | 10/2016 | Dintheer | E06B 7/18 |
| 2016/0347465 A1 * | 12/2016 | Mellor | B64D 29/06 |
| 2017/0058583 A1 | 3/2017 | Kim et al. | |
| 2017/0101811 A1 * | 4/2017 | Parsell, Jr | E05C 19/145 |
| 2017/0298650 A1 * | 10/2017 | Minter | E05B 15/0006 |
| 2021/0347494 A1 * | 11/2021 | Aguilar Ante | B64D 29/08 |

\* cited by examiner

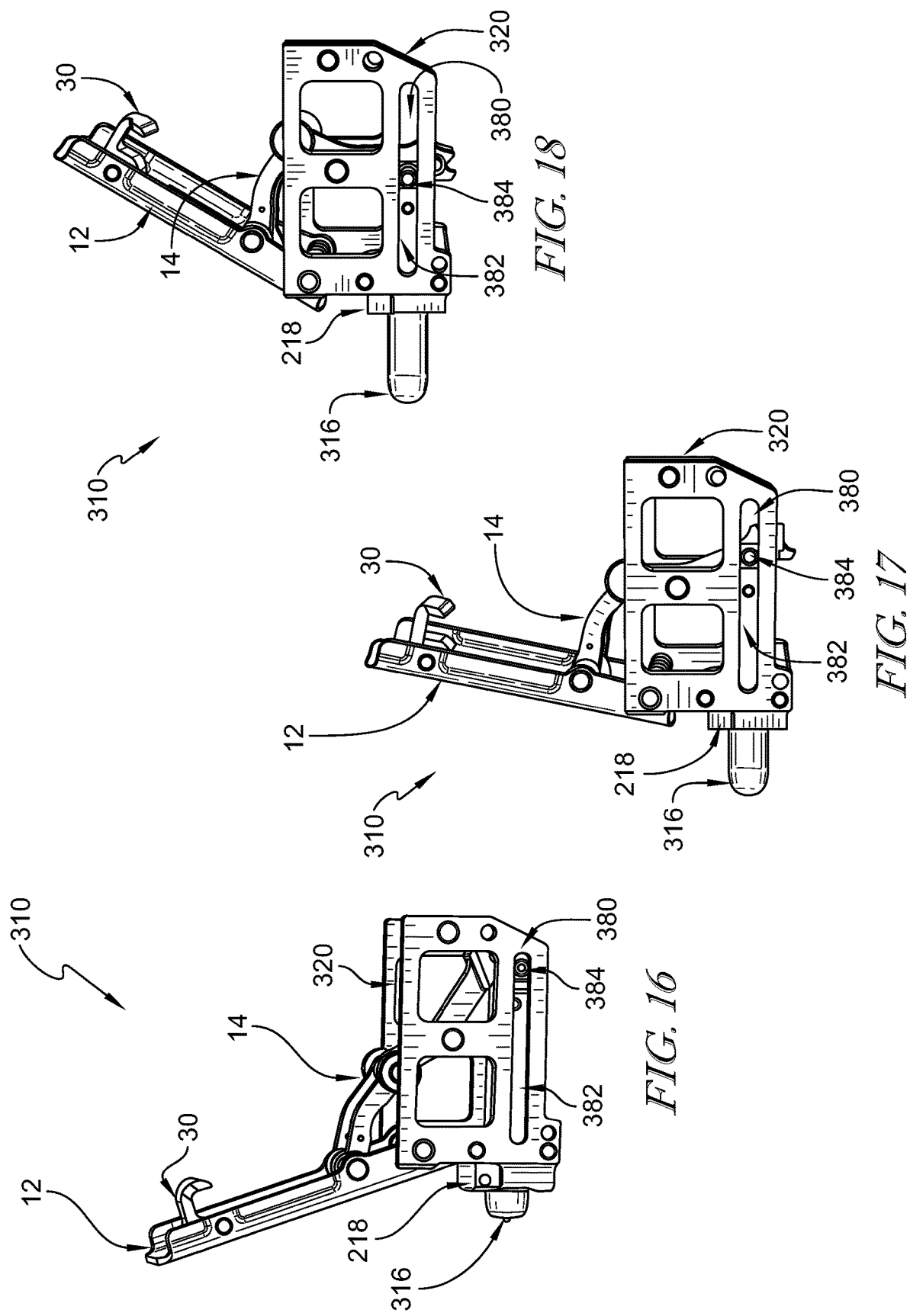

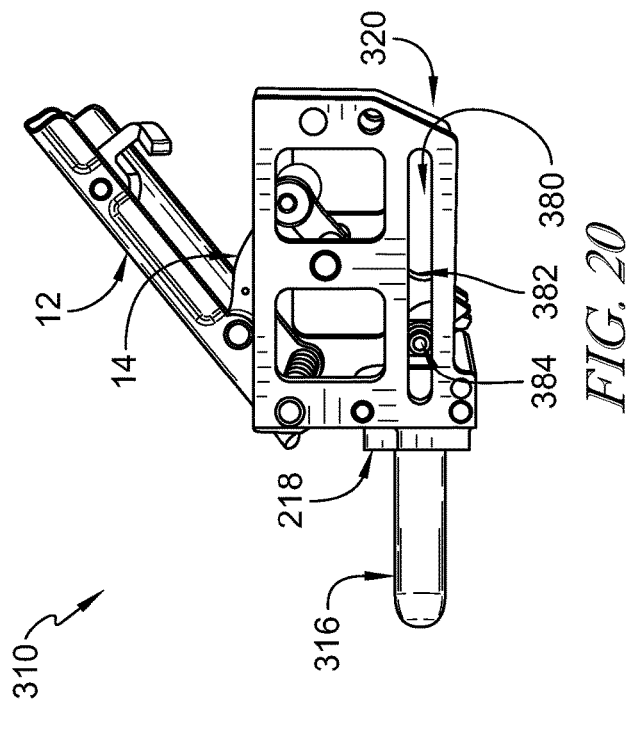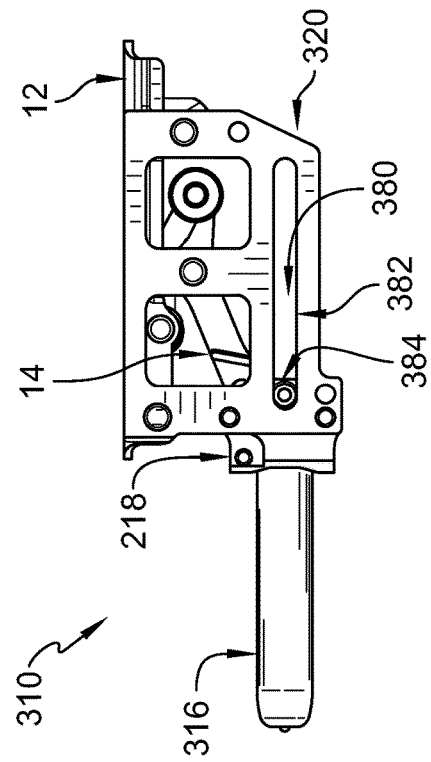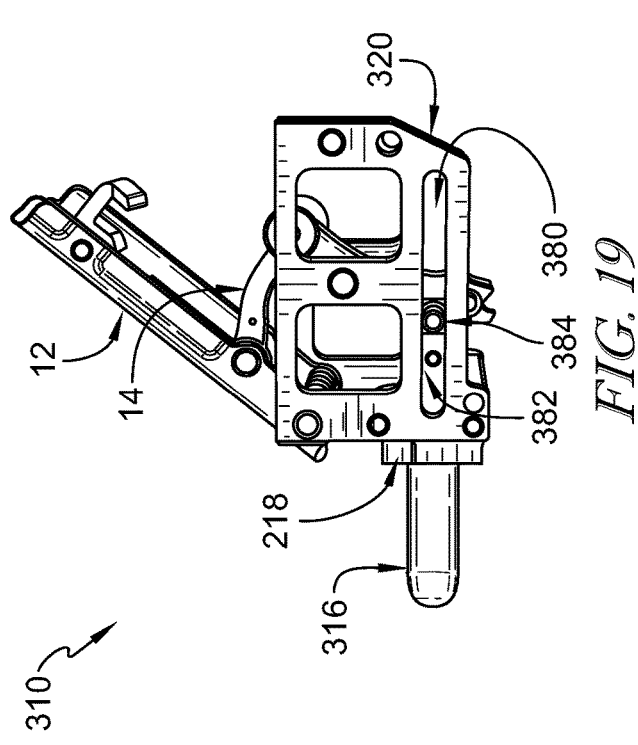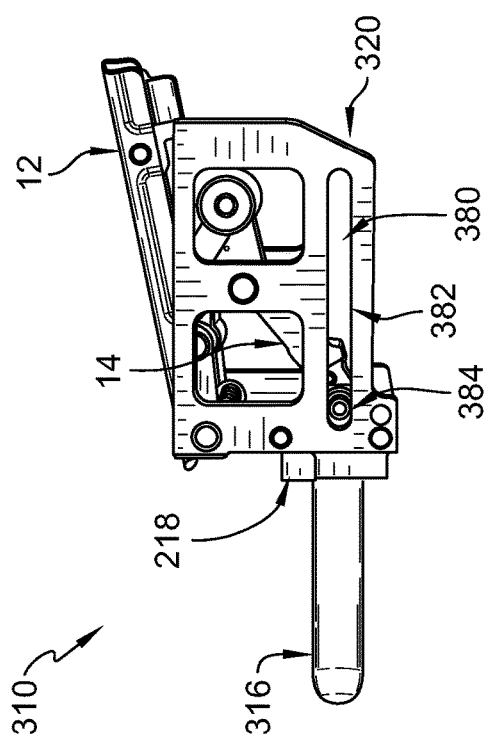

PIN LATCH WITH ADJUSTABLE PRE-LOAD

PRIORITY CLAIM

This application claims priority under 35 U.S.C. § 119(e) to U.S. Provisional Application Ser. Nos. 62/618,430, filed Jan. 17, 2018, and 62/752,055, filed Oct. 29, 2018, both of which are expressly incorporated by reference herein.

FIELD OF THE DISCLOSURE

The present disclosure relates generally to a latch for use on an aircraft, and more specifically to a pin latch for holding one component relative to another component on an aircraft.

BACKGROUND

A variety of latches are used on aircraft to retain various components of the aircraft in a locked condition under circumstances such as flight and storage of the aircraft. Full release of these latches can occur with activation of a trigger, and the latches can become unintentionally released if the trigger is not fully set. It would be desirable to develop a system and assembly to be used with a latch to help provide assurances that the latch will, in fact, be closed and locked in the proper position.

This background provides some information believed to be of possible relevance to the present disclosure. No admission is intended, nor is such an admission to be inferred or construed, that any of the preceding information constitutes prior art against the present disclosure.

SUMMARY

The present disclosure includes an adjustable pre-load mechanism for use with a pin latch system. The pre-load mechanism holds a linkage of the latch system in an over-center configuration until a connected handle is rotated. The latch system is not fully released solely with activation of a trigger used to hold the handle in a closed position. The handle is rotated to move the linkage out of the over-center configuration to allow release of the latch. An amount of pre-load through the linkage is adjustable.

According to the present disclosure, a latch mechanism includes a handle connected to a pin by a linkage. The linkage converts rotation of the handle relative to a frame into axial movement of the pin between extended and retracted positions relative to the frame.

In illustrative embodiments, a pre-load adjustment mechanism is coupled to the frame. The pin engages with the pre-load adjustment mechanism in the extended position to apply a pre-load through the linkage to bias the linkage toward an over-center configuration and bias the pin toward the extended position.

In illustrative embodiments, the pre-load adjustment mechanism includes a mount coupled to the frame and a collar coupled to the mount. The pin engages with the collar in the extended position to apply the pre-load. The collar is adjustable relative to the mount to set the pre-load through the linkage to a predetermined value.

In illustrative embodiments, the pre-load adjustment mechanism includes a mount coupled to the frame and a collar, a spring, and a washer received in the mount. The pin engages with the washer in the extended position and against a bias of the spring to apply the pre-load. The collar is adjustable relative to the mount to set the pre-load through the linkage to a predetermined value.

In illustrative embodiments, a pin-travel guide includes a slider coupled to the pin and a slot formed in the frame. The slider extends into the slot. The pin-travel guide is configured to support the pin against skewing relative to the frame during movement between the extended and retracted positions.

Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which:

FIGS. 16-22 are a series of views illustrating movement of the latch mechanism of FIG. 12 between the opened and closed positions.

Figure 1:
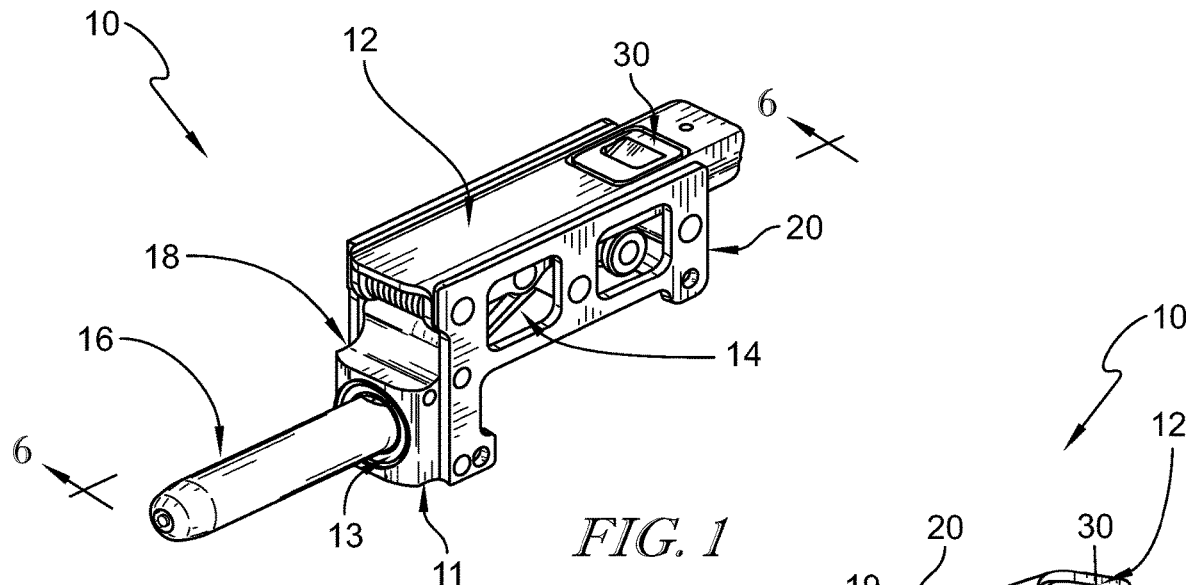
FIG. 1 is an upper perspective view of a latch mechanism in accordance with the present disclosure showing the latch mechanism in a closed position and that the latch mechanism includes a handle coupled to a pin by a linkage for movement of the pin between an extended position, shown in FIG. 1, and a retracted position, shown in FIG. 3, with movement of the handle.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

Figure 2:
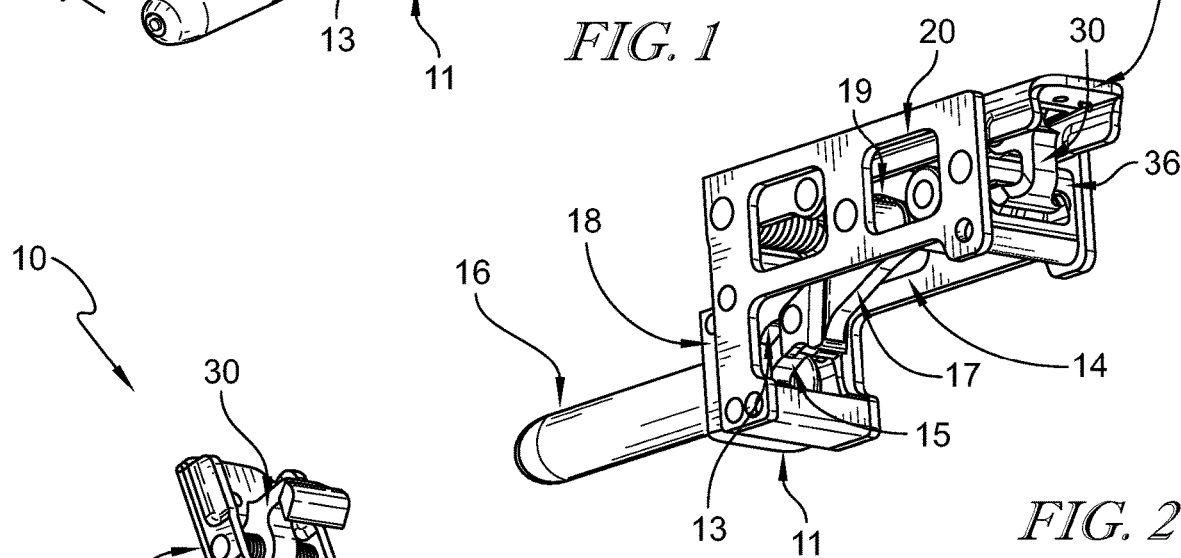
FIG. 2 is a lower perspective view of the latch mechanism of FIG. 1 showing that the linkage is in an over-center configuration when the latch mechanism is in the closed position and suggesting that the pin engages with a pre-load adjustment mechanism to apply a pre-load through the linkage to bias the pin toward the extended position.
Figure 3:
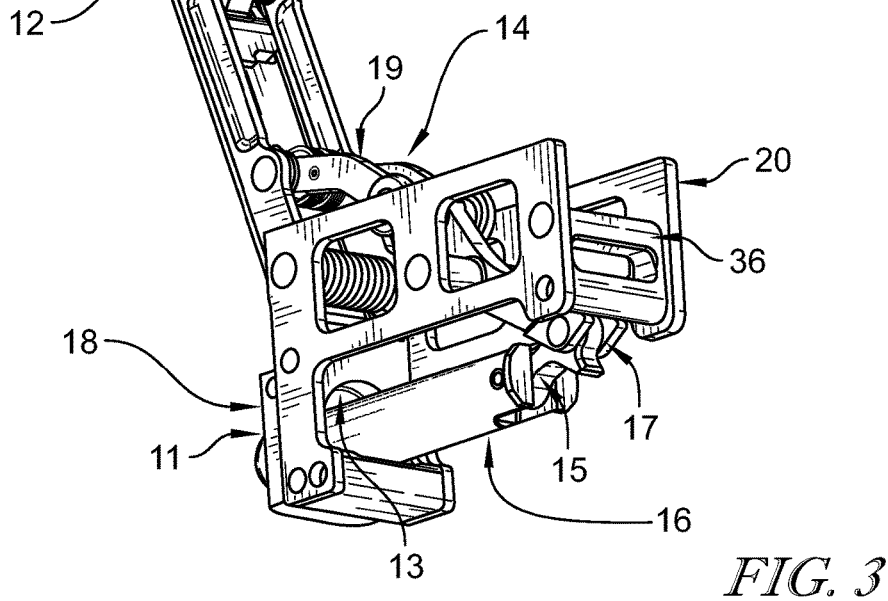
FIG. 3 is a view similar to FIG. 2 showing the latch mechanism in an opened position and the pin in the retracted position and suggesting that the handle rotates relative to a frame of the latch mechanism to move the linkage and attached pin.

A latch mechanism 10 in accordance with the present disclosure is shown in FIG. 1. Latch mechanism 10 includes a handle 12 coupled to a pin 16 by a linkage 14. Linkage 14 translates rotation of handle 12 relative to a frame 20 into axial movement of pin 16. Latch mechanism 10 is movable between a closed position with pin 16 extended, as shown in FIGS. 1 and 2, and an opened position with pin 16 retracted, as shown in FIG. 3. Pin 16 engages with a pre-load adjustment mechanism 18 when latch mechanism 10 is moved to the closed position to apply a pre-load through linkage 14 that biases pin 16 toward the extended position as suggested in FIG. 2.

Figure 6:
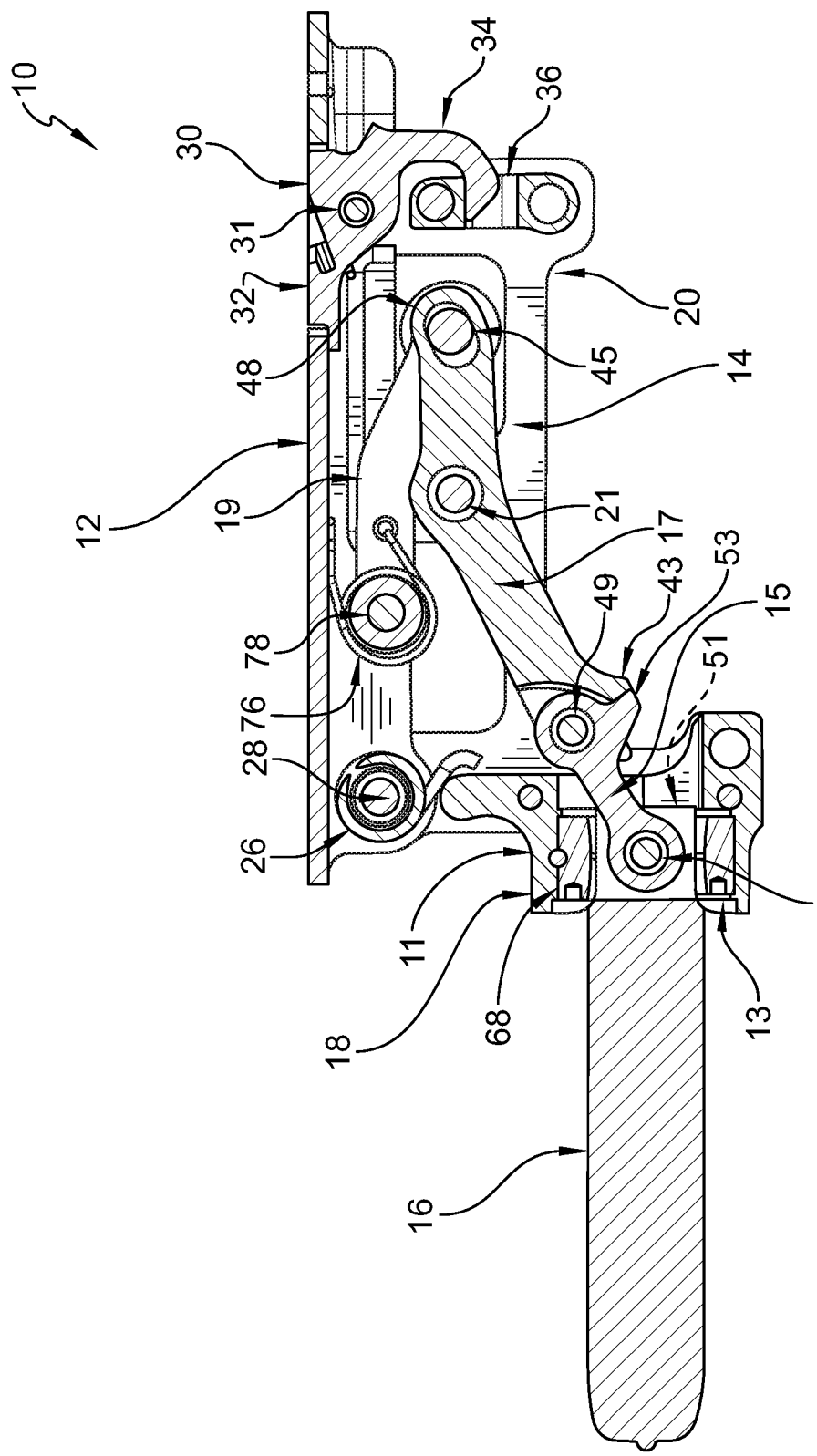
FIG. 6 is a sectional view taken along line 6-6 in FIG. 1 showing that the linkage includes a pivot link coupled to the frame, a handle connector coupled between the handle and the pivot link, and a pin link coupled between the pin and the pivot link and suggesting that a flange of the pin engages with the adjustment mechanism to force projections of the pin link and pivot link against one another to apply the pre-load through the linkage.
Figure 7:
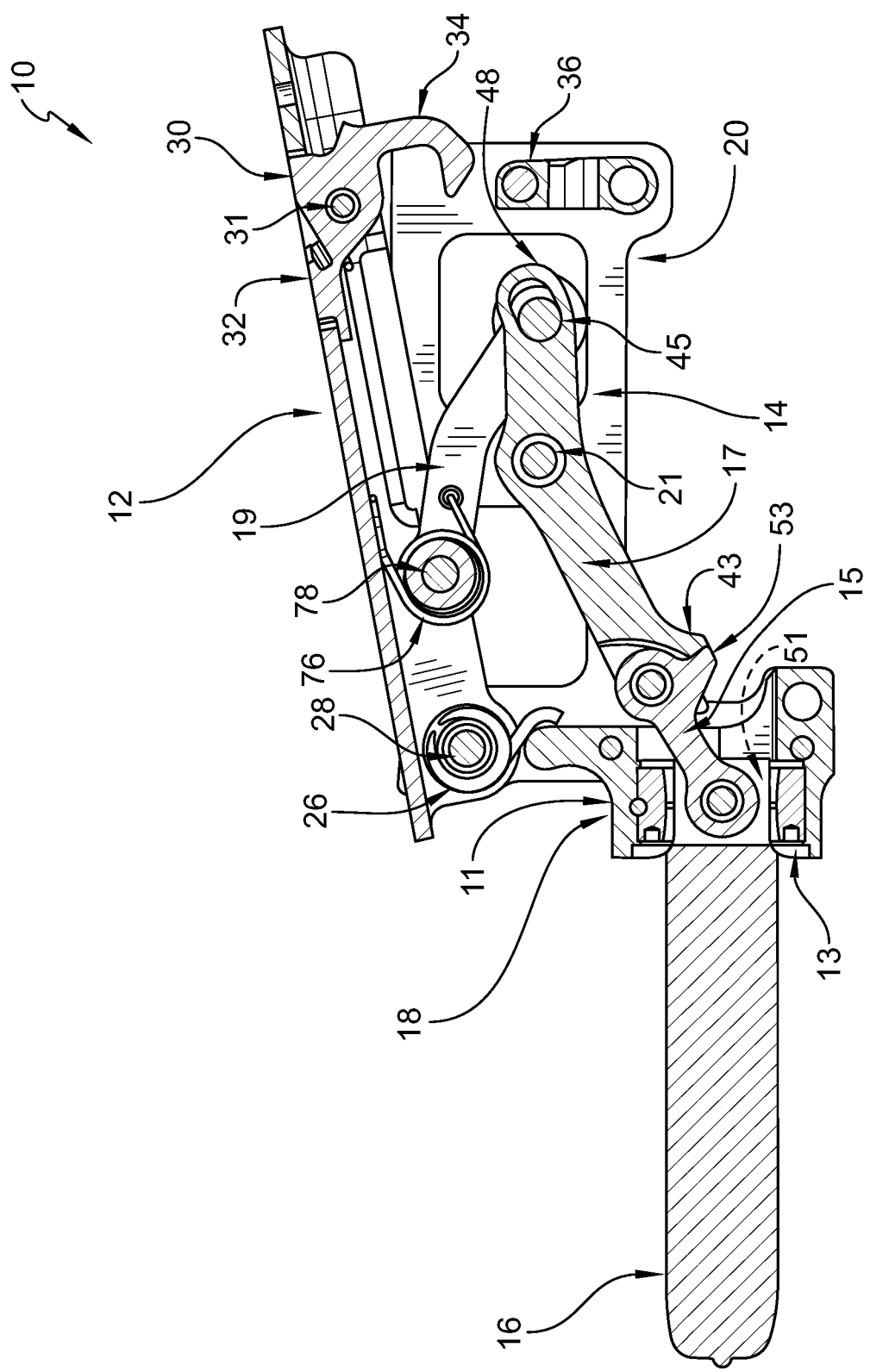
FIG. 7 is a view similar to FIG. 6 showing the handle moved to a free position in which the trigger has been actuated to release the handle and suggesting that the pre-load through the linkage holds the pin in the extended position until a force is applied to the handle to move the linkage out of the over-center configuration against the pre-load.

Linkage 14 includes a pin link 15, a pivot link 17, and a handle connector 19 as shown in FIGS. 2 and 6-7. Pivot link 17 is coupled to frame 20 for rotation relative thereto. Pin link 15 is coupled between pin 16 and pivot link 17. Handle connector 19 is coupled between handle 12 and pivot link 17. A trigger 30 coupled to handle 12 engages with a catch 36 coupled to frame 20 to block rotation of handle 12 and hold latch mechanism 10 in the closed position at the selection of a user. Linkage 14 is placed in an over-center configuration where a point of rotation between pin link 15 and pivot link 17 is offset from an axis extending through points of rotation relative to pin 16 and frame 20 of pin link 15 and pivot link 17, respectively.

Pre-load adjustment mechanism 18 includes a mount 11 coupled to frame 20 and a collar 13 received in mount 11 as shown in FIGS. 1-3 and 6. In some embodiments, mount 11 is formed as part of frame 20. Pin 16 engages with collar 13 when latch mechanism 10 is moved to the closed position and forces pin link 15 to engage with pivot link 17 to apply the pre-load through linkage 14. A relative position of collar 13 and mount 11 can be adjusted to set the pre-load through linkage 14 to a predetermined value as selected by a user. The applied pre-load through linkage 14 holds pin 16 in the extended position until a force is applied to handle 12 toward the opened position to move linkage 14 out of the over-center configuration against the pre-load as suggested in FIGS. 6-8.

Figure 4:
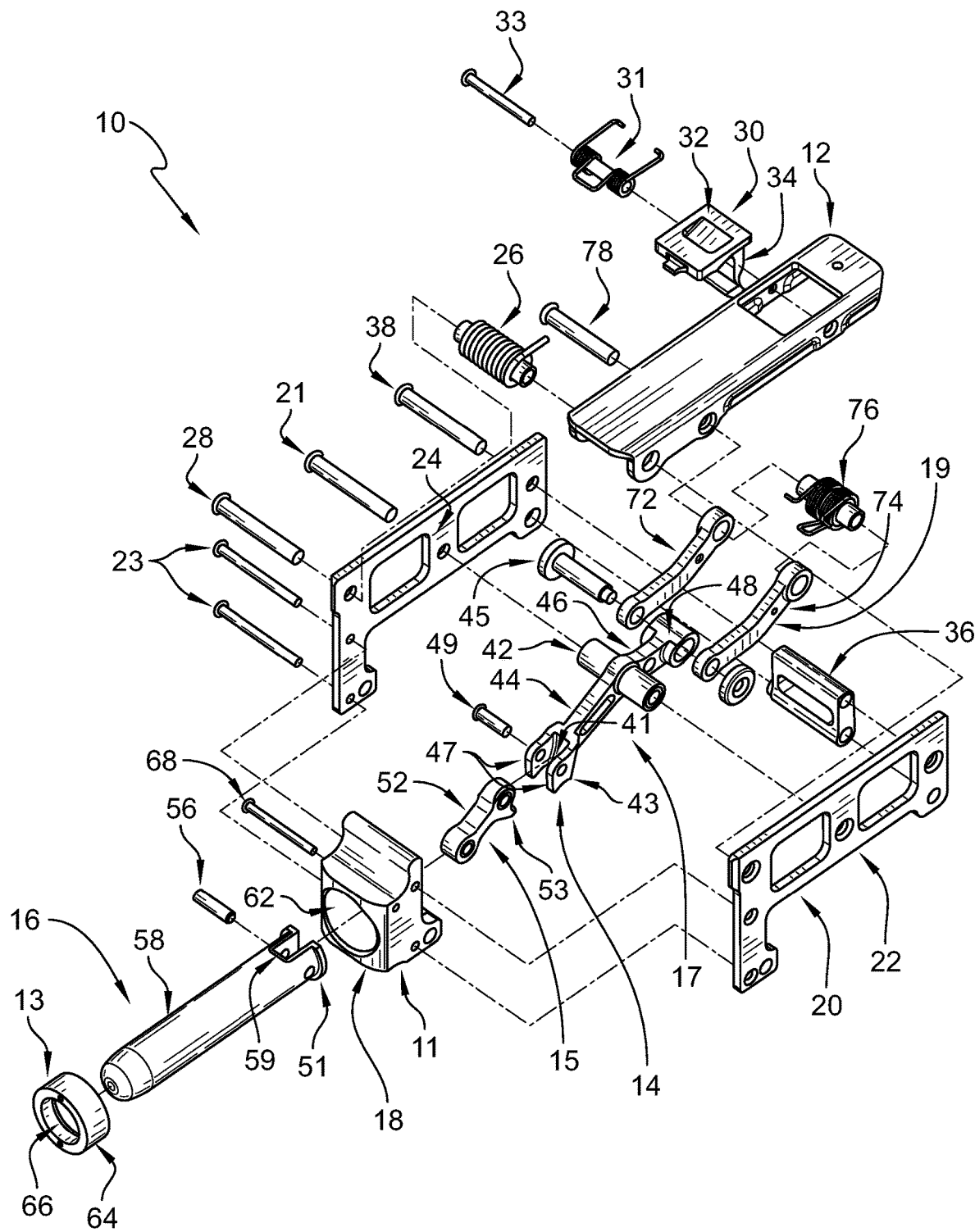
FIG. 4 is an exploded perspective assembly view of the latch mechanism of FIG. 1 showing that the pre-load adjustment mechanism includes a mount coupled to the frame and a collar received in the mount and suggesting that a relative position of the collar and mount can be adjusted to set the pre-load through the linkage to a predetermined value.

Frame 20 includes spaced apart first and second side plates 22, 24 as shown in FIG. 4. A fastener 21, such as a rivet, couples pivot link 17 to frame 20. A fastener 28 couples handle 12 and a main spring 26 to frame 20. Main spring 26 engages with handle 12 and mount 11 to bias handle 12 toward the opened position. Fasteners 23 couple mount 11 with frame 20. A fastener 38 couples catch 36 with frame 20. Additional holes are provided in frame 20 for attachment of latch mechanism 10 with a housing 100 as suggested in FIG. 5.

Trigger 30 includes a button pad 32 and a hook 34 as shown in FIG. 4. A fastener 33 couples trigger 30 and a trigger spring 31 with handle 12. Hook 34 engages with catch 36 when latch mechanism 10 is moved to the closed position. Trigger spring 31 biases hook 34 toward catch 36. A user engages with button pad 32 to pivot trigger 30 about fastener 33 and move hook 34 away from catch 36 to allow handle 12 to rotate relative to frame 20. In some embodiments, button pad 32 is formed to include a slot for receiving a tool, such as a flat blade screwdriver, used to pivot trigger 30.

Pivot link 17 includes a spindle 42, a first arm 44 coupled to spindle 42, and a second arm 46 coupled to an opposite side of spindle 42 from first arm 44 as shown in FIGS. 4 and 6. Spindle 42 extends between side plates 22, 24 of frame 20 and receives fastener 21 for coupling pivot link 17 with frame 20. A pair of flanges 47 extend outward from an end of first arm 44 and define a slot 41 configured to receive pin link 15. A projection 43 extends downward (in the orientation of FIGS. 4 and 6) from a lower portion of first arm 44 adjacent to slot 41. A fastener 49 couples pin link 15 with pivot link 17. A slot 48 is formed at an end of second arm 46. A fastener 45 extends through slot 48 and couples handle connector 19 with pivot link 17. Slot 48 is sized to allow fastener 45 to move within slot 48 relative to spindle 42.

Pin link 15 includes a body 52 and a projection 53 formed at one end of body 52 as shown in FIG. 4. The end of pin link 15 having projection 53 is received in slot 41 of pivot link 17. An opposite end of pin link 15 is received in a slot 59 formed in a shaft 58 of pin 16. A fastener 56 couples pin link 15 with pin 16.

Mount 11 of pre-load adjustment mechanism 18 is formed to include a bore 62 for receiving collar 13 as suggested in FIG. 4. Collar 13 includes an annular body 64 and an aperture 66 extending through annular body 64. In the illustrative embodiment, an interior of bore 62 and an exterior of annular body 64 are threaded to engage collar 13 with mount 11 and allow adjustment therebetween by rotation of collar 13 relative to mount 11 to set the pre-load to a predetermined level as selected by a user. In some embodiments, a fastener 68 is used to fix a position of collar 13 relative to mount 11. Shaft 58 of pin 16 is sized to extend through bore 62 and aperture 66 while a flange 51 coupled to shaft 58 is sized to engage with collar 13 to block pin 16 from passing completely through collar 13 and apply the pre-load through linkage 14 when latch mechanism 10 is moved to the closed position as suggested in FIGS. 4 and 6.

Handle connector 19 includes a pair of links 72, 74 coupled to opposing sides of pivot link 17 as shown in FIG. 4. A fastener 78 couples handle connector 19 and a pop-up spring 76 with handle 12. Pop-up spring 76 engages with links 72, 74 and handle 12 to bias handle 12 toward a free position as suggested in FIGS. 4 and 7.

Figure 5:
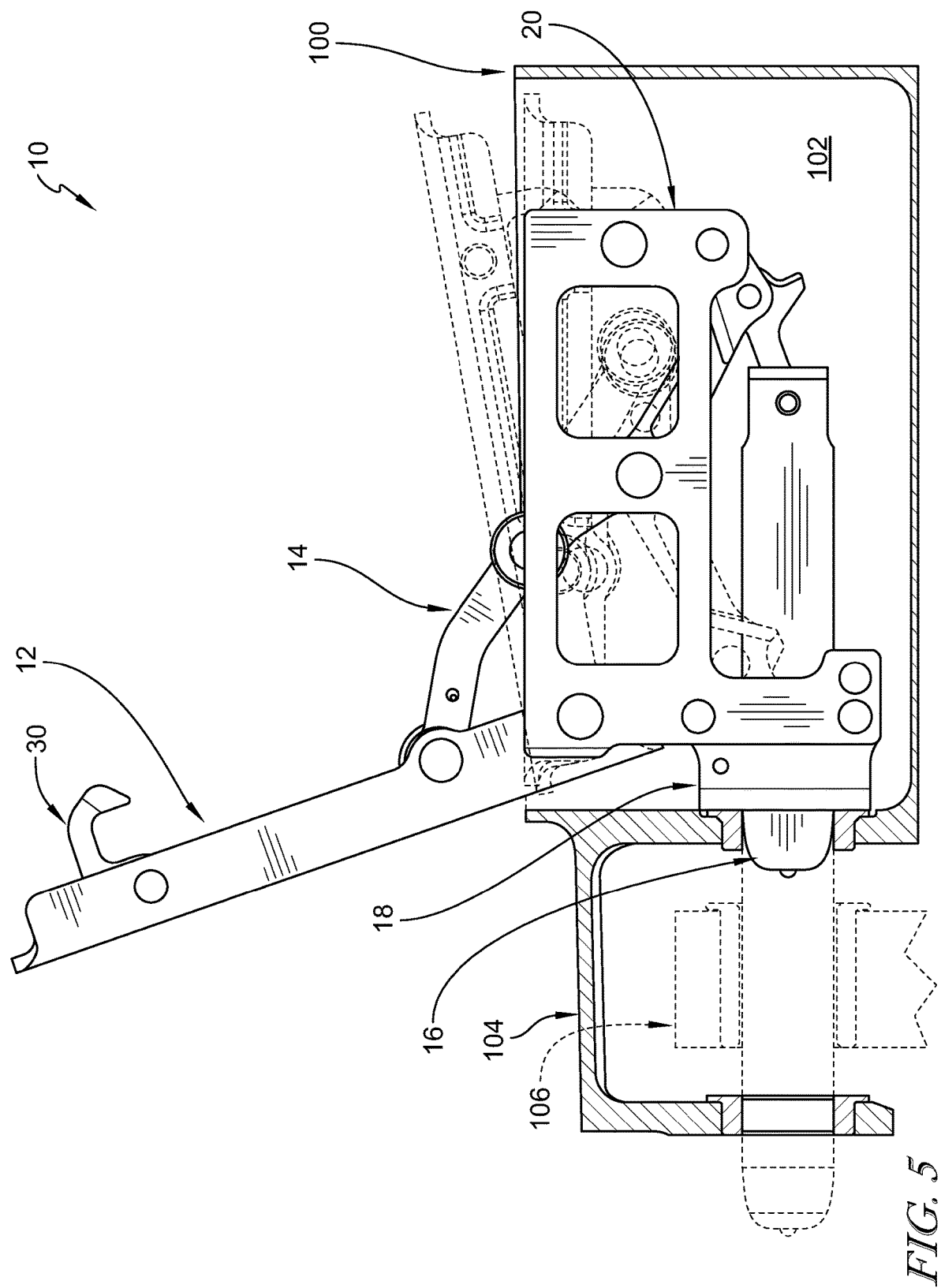
FIG. 5 is a side elevation view of the latch mechanism of FIG. 1 showing the latch mechanism received in a housing of a first component and suggesting that the pin is movable from the retracted position to the extended position to engage with an eye of a second component to block movement of the first component relative to the second component.

One embodiment of a housing 100 used to attach latch mechanism 10 with a first component, such as an aircraft door or panel, is shown in FIG. 5. Housing 100 includes a cavity 102 configured to receive latch mechanism 10 therein and a channel 104 coupled to cavity 102. In some embodiments, housing 100 is integrated into the first component or coupled thereto. Channel 104 is configured to receive an eye 106 of a second component, such as an aircraft frame or panel adjacent to the first component. In some embodiments, eye 106 is integrated into the second component or coupled thereto. Latch mechanism 10 is configured to extend pin 16 through eye 106 to block movement of the first component relative to the second component, such as to hold an aircraft door closed over an opening of a panel of the aircraft.

Movement of handle 12 to the closed position moves pin 16 to the extended position and places linkage 14 into the over-center configuration as shown in FIG. 6. In the over-center configuration, the connection point between pin link 15 and pivot link 17 (i.e., at fastener 49) is offset toward handle 12 from an axis extending between a connection point between frame 20 and pivot link 17 (i.e., at fastener 21) and a connection point between pin link 15 and pin 16 (i.e., at fastener 56). Pin 16 engages with pre-load adjustment mechanism 18 in the extended position to force projections 43, 53 of pivot link 17 and pin link 15, respectively, against one another and apply the pre-load through linkage 14.

Figure 8:
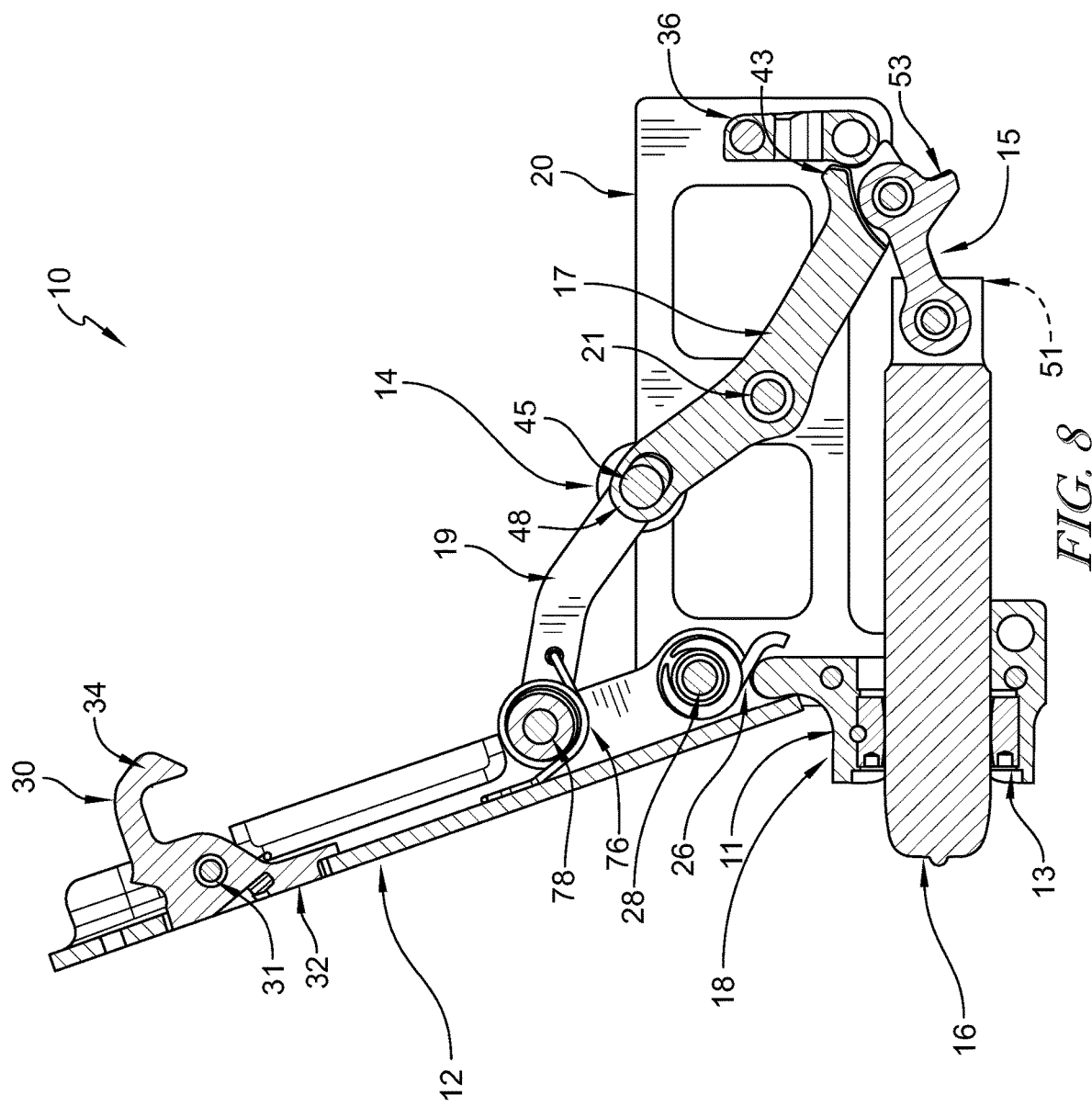
FIG. 8 is a view similar to FIG. 7 showing that the projections of the pin link and the pivot link are disengaged from one another when the latch mechanism is in the opened position.

The pre-load through linkages 14 biases pin 16 toward the extended position and biases linkage 14 toward the over-center configuration as suggested in FIG. 6. The pre-load holds pin 16 in the extended position independent of trigger 30 such that movement of handle 12 to a free position, as shown in FIG. 7, does not move linkage 14 out of the over-center configuration alone. Fastener 45 moves in slot 48 as handle 12 moves from the closed position to the free position as suggested in FIGS. 6 and 7. A force applied to handle 12 toward the opened position forces pivot link 17 to rotate (counter-clockwise from FIG. 7 to FIG. 8) in order to move linkage 14 out of the over-center configuration. Projections 43, 53 are spaced apart from one another in the opened position as shown in FIG. 8. In some embodiments, pivot link 17 engages with catch 36 to limit rotation of handle 12.

Figure 9:
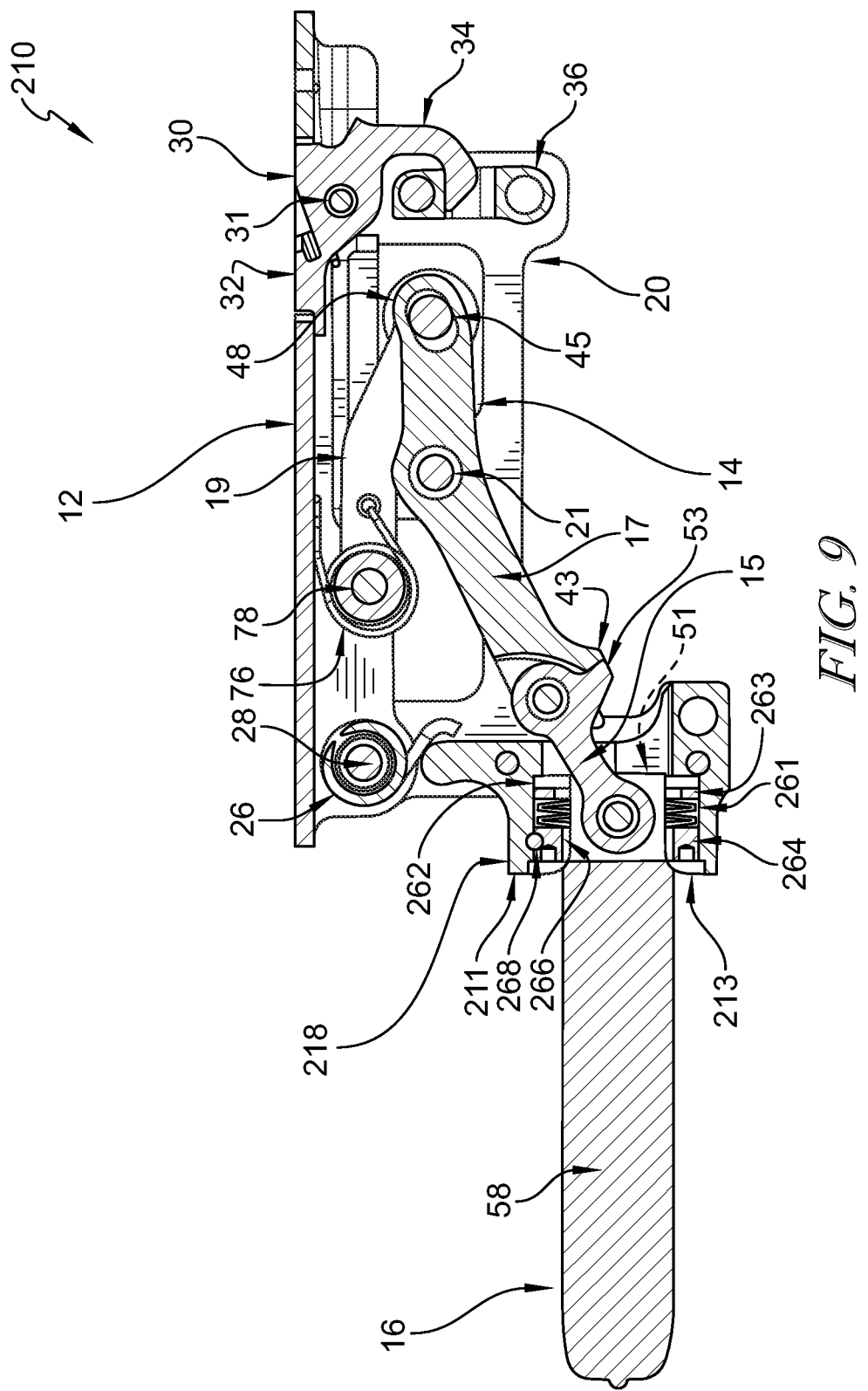
FIG. 9 is a sectional view through another embodiment of a latch mechanism in accordance with the present disclosure showing that a pre-load adjustment mechanism of the latch mechanism includes a mount and a collar, a spring, and a washer received in the mount and suggesting that a pin engages with the washer against a bias of the spring to apply a pre-load through a linkage connecting the pin with a handle.
Figure 10:
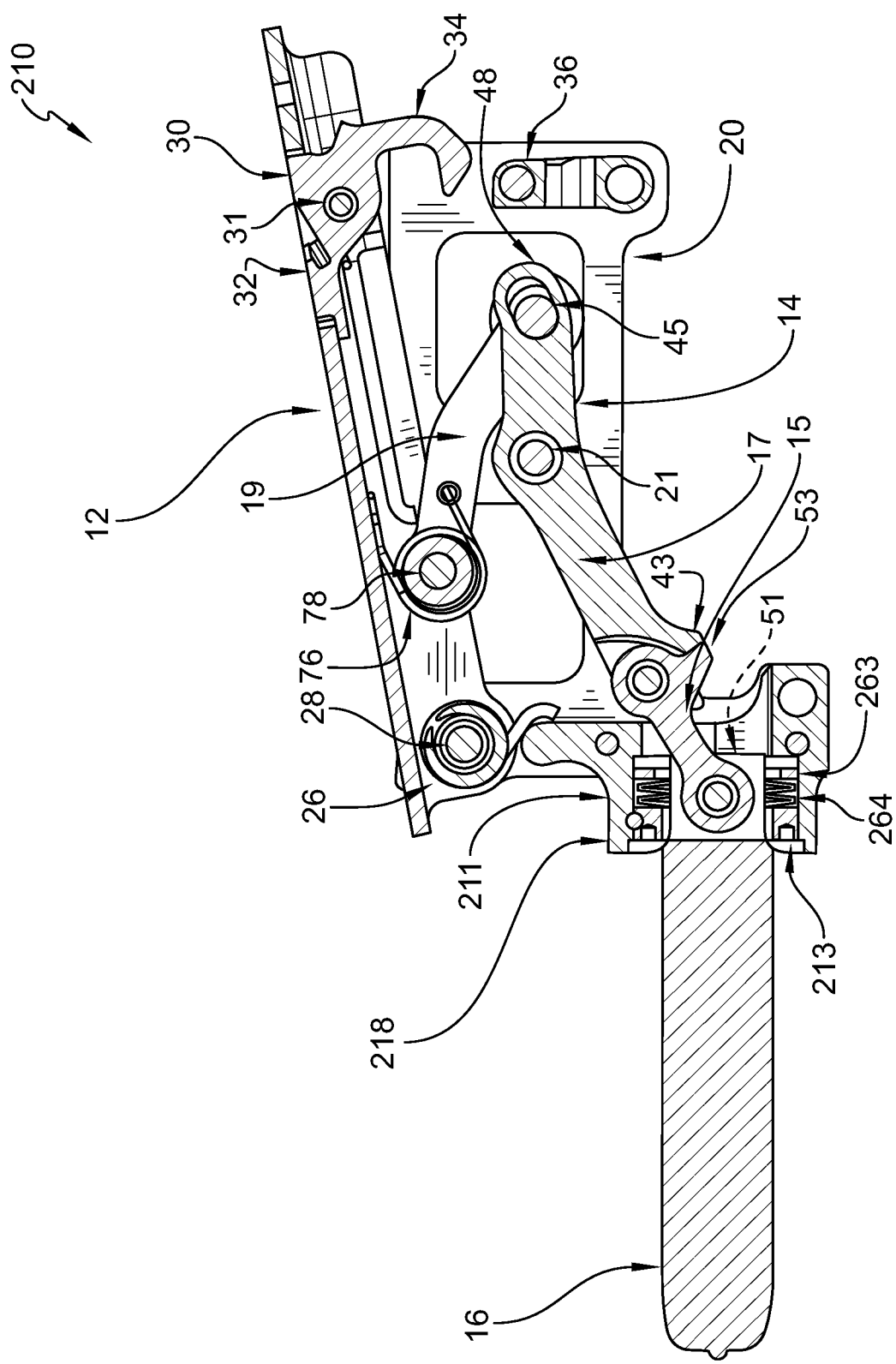
FIG. 10 is a view similar to FIG. 9 showing the handle in a free position and suggesting that the pre-load through the linkage holds the pin in an extended position until a force is applied to the handle to move the linkage out of an over-center configuration against the pre-load.
Figure 11:
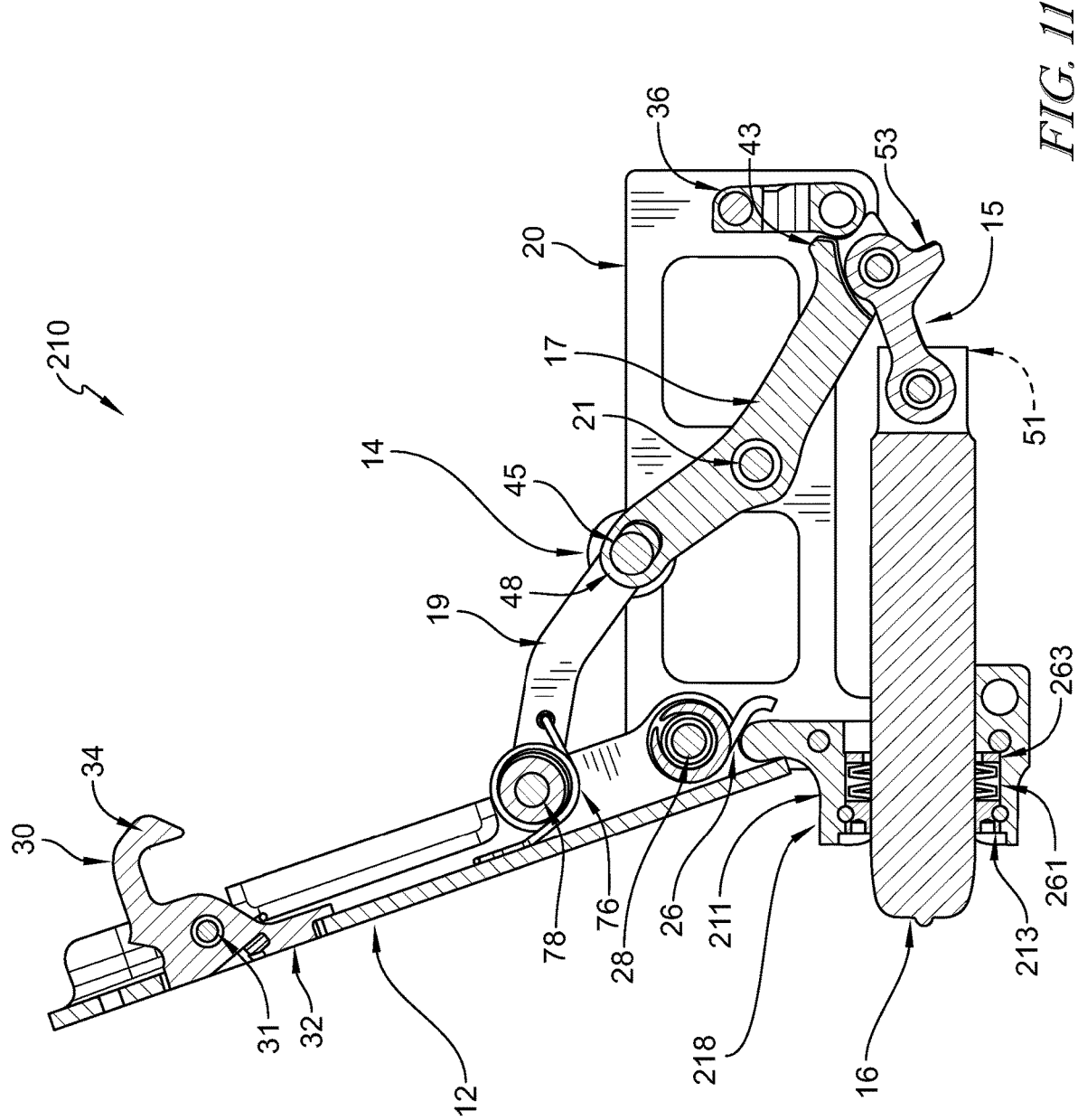
FIG. 11 is a view similar to FIG. 10 showing the latch mechanism in an opened position and suggesting that the spring forces the washer to move relative to the mount as the pin moves from the extended position to a retracted position.
Figure 12:
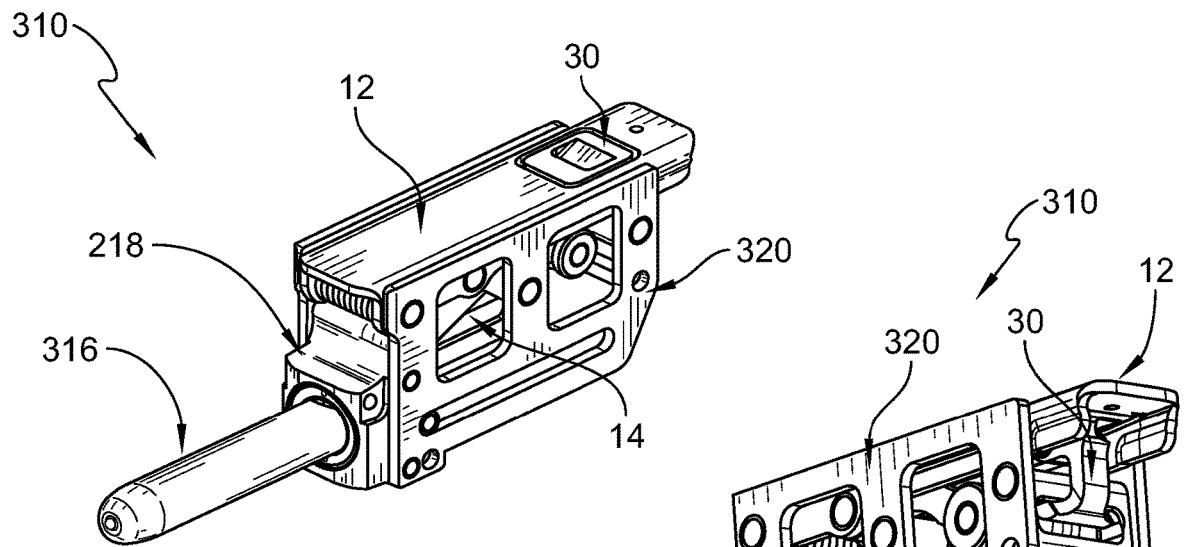
FIG. 12 is an upper perspective view of another embodiment of a latch mechanism in accordance with the present disclosure showing the latch mechanism in a closed position and that the latch mechanism includes a handle coupled to a pin by a linkage for movement of the pin between an extended position, shown in FIG. 12, and a retracted position, shown in FIG. 14, with movement of the handle.
Figure 13:
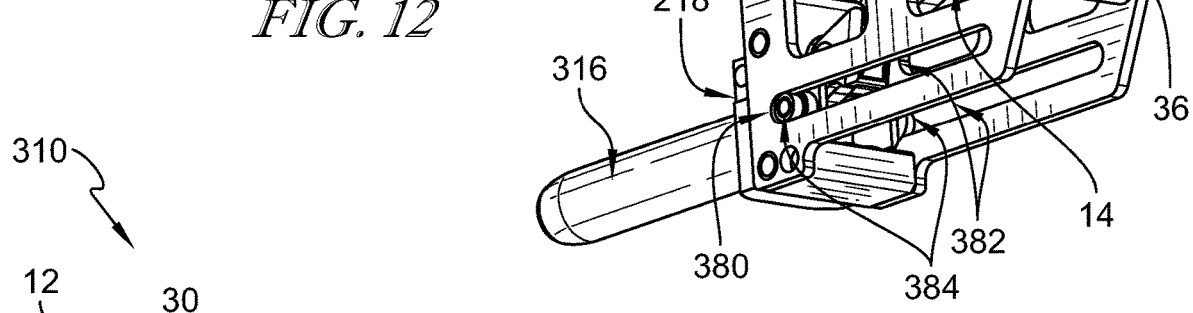
FIG. 13 is a lower perspective view of the latch mechanism of FIG. 12 showing that a pin-travel guide includes slots formed in a frame and sliders coupled to the pin for movement in the slots with the pin and suggesting that the sliders are positioned at a first end of the slots in the closed position.
Figure 14:
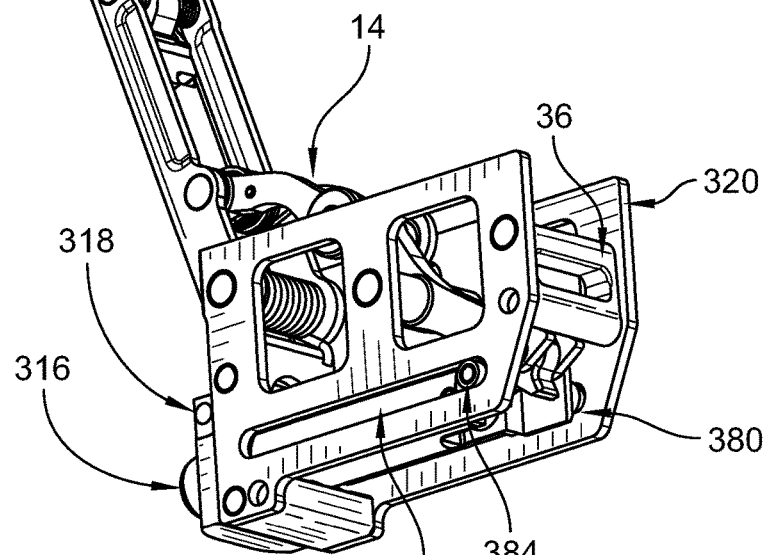
FIG. 14 is a view similar to FIG. 13 showing the latch mechanism in an opened position and the pin in the retracted position and suggesting that the handle rotates relative to a frame of the latch mechanism to move the linkage and attached pin and that the sliders of the pin-travel guide move in the slots from the first end toward a second opposite end of the slots to support the pin against skewing relative to the frame during movement between the extended and retracted positions.

Another embodiment of a latch mechanism 210 is shown in FIGS. 9-11. Latch mechanism 210 is similar to latch mechanism 10 shown in FIGS. 1-8, with one difference being that a pre-load adjustment mechanism 218 includes a spring 261 configured to pre-load linkage 14 when pin 16 is in the extended position and bias linkage 14 toward the over-center configuration. The pre-load through linkage 14 biases pin 16 toward the extended position and biases linkage 14 toward the over-center configuration. The pre-load holds pin 16 in the extended position independent of trigger 30 such that movement of handle 12 to a free position, as shown in FIG. 10, does not move linkage 14 out of the over-center configuration alone. Fastener 45 moves in slot 48 as handle 12 moves from the closed position to the free position as suggested in FIGS. 9 and 10. A force applied to handle 12 toward the opened position forces pivot link 17 to rotate (counter-clockwise from FIG. 10 to FIG. 11) in order to move linkage 14 out of the over-center configuration.

Pre-load adjustment mechanism 218 includes a mount 211 coupled to frame 20, spring 261 and a washer 263 received in mount 211, and a collar 213 engaged with mount 211 to hold spring 261 and washer 263 in mount 211 as shown in FIG. 9. Collar 213, spring 261, and washer 263 are received in a bore 262 of mount 211. Collar 213 includes an annular body 264 and an aperture 266 extending through annular body 264. In the illustrative embodiment, an interior of bore 262 and an exterior of annular body 264 are threaded to engage collar 213 with mount 211 and allow adjustment therebetween by rotation of collar 213 relative to mount 211 to set the pre-load to a predetermined level. In some embodiments, a stiffness of spring 261 is selected to set the pre-load to a predetermined level as selected by a user. In some embodiments, a fastener 268 is used to fix a position of collar 213 relative to mount 211.

Shaft 58 of pin 16 is sized to extend through washer 263, spring 261, bore 262 and aperture 266 while flange 51 coupled to shaft 58 is sized to engage with washer 263 to block pin 16 from passing completely through pre-load adjustment mechanism 218 and apply the pre-load through linkage 14 when latch mechanism 210 is moved to the closed position as suggested in FIG. 9. Spring 261 biases washer 263 away from collar 213. Spring 261 expands and contracts, and washer 263 moves within bore 262, as pin 16 moves between the extended and retracted positions as suggested in FIGS. 9-11.

Another embodiment of a latch mechanism 310 is shown in FIGS. 12-22. Latch mechanism 310 is similar to latch mechanism 210 shown in FIGS. 9-11, with one difference being that latch mechanism 310 includes a pin-travel guide 380 that supports a pin 316 against skewing relative to a frame 320 during movement of pin 316 between extended and retracted positions as suggested in FIGS. 13 and 14. Pin-travel guide 380 includes one or more slots 382 formed in frame 320 and one or more sliders 384 coupled to pin 316 that extend into slots 382. Sliders 384 engage with slots 382 to maintain alignment of pin 316 with pre-load adjustment mechanism 218 and prevent binding of pin 316 during travel between the extended and retracted positions.

Figure 15:
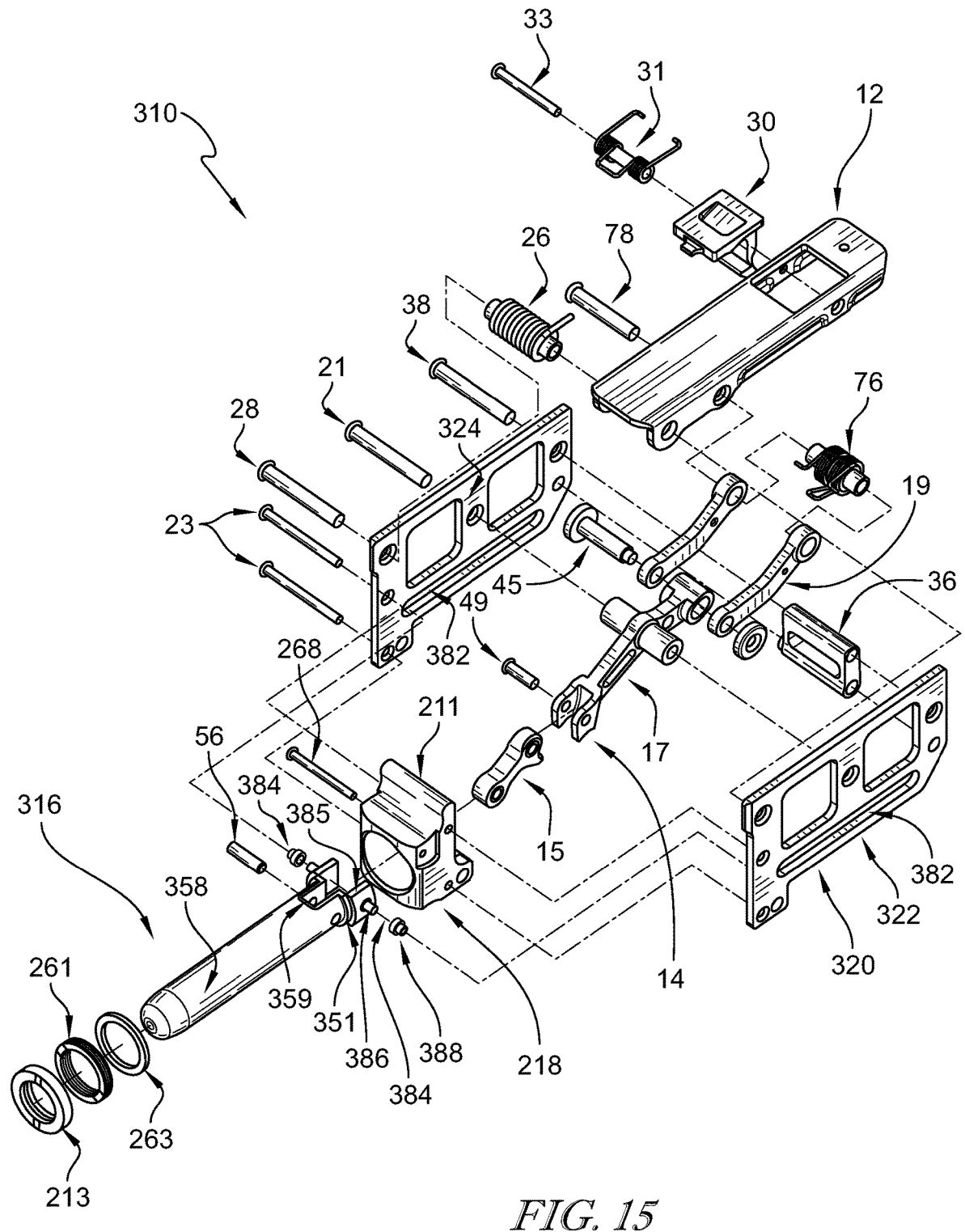
FIG. 15 is an exploded perspective assembly view of the latch mechanism of FIG. 12 showing that the sliders of the pin-travel guide include bosses coupled to the pin and bushings coupled to the bosses.

Pin 316 includes a shaft 358 and a flange 351 coupled to shaft 358 as shown in FIG. 15. A slot 359 is formed though an end of shaft 358. In the illustrative embodiment, tabs 385 extend from flanges 351 toward linkage 14. Each slider 384 includes a boss 386 coupled to one of tabs 385 and a bushing 388 coupled to boss 386. Frame 320 includes side plates 322, 324. Bushings 388 are positioned on opposing sides of pin 316 to extend into slots 382 of side plates 322, 324 of frame 320. In some embodiments, no bushings 388 are used, and bosses 386 extend into slots 382 to guide movement of pin 316.

Movement of latch mechanism 310 between the opened and closed positions is shown in FIGS. 16-22. In the opened position, shown in FIG. 16, pin 316 is in the retracted position and sliders 384 are positioned at an end of slots 382 opposite from pre-load adjustment mechanism 218. Movement of handle 12 rotates linkage 14 to move pin 316 toward the extended position and sliders 384 ride in slots 382 toward pre-load adjustment mechanism 218 to guide movement of pin 316 as suggested in FIGS. 17-21. In the closed position, shown in FIG. 22, pin 316 is in the extended position and sliders 384 are positioned at an end of slots 382 adjacent to pre-load adjustment mechanism 218.

In illustrative embodiments, a pin latch has an adjustable self-contained pre-loaded over-center primary lock. The primary lock (pre-loaded over-center linkage) is isolated from a secondary lock (trigger) on a handle of the latch such that axial load on a shear pin of the latch is not transferred to the handle and trigger that may force the latch to open. The amount of pre-load in the over-center linkage is adjustable.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A latch mechanism comprising:
    a frame;
    a handle coupled to the frame for rotation relative to the frame;
    a linkage coupled to the handle and the frame;
    a pin coupled to the linkage; and
    a pre-load adjustment mechanism coupled to the frame,
    wherein the linkage is configured to convert rotation of the handle into axial movement of the pin relative to the pre-load adjustment mechanism between an extended position and a retracted position, the pin extends from the frame in the extended position, and the pre-load adjustment mechanism is configured to engage with the pin in the extended position to place a pre-load through the linkage to bias the linkage toward an over-center configuration and bias the pin toward the extended position,
    wherein the pre-load adjustment mechanism includes a mount coupled to the frame and a collar coupled to the mount, wherein a shaft of the pin is sized to extend through the mount and the collar, and wherein the collar is movable relative to the mount at the selection of a user to adjust an amount of pre-load through the linkage when the pin is in the extended position, and
    wherein the linkage includes a pivot link coupled to the frame for rotation relative to the frame, a pin link coupled between the pivot link and the pin, and a connection point between the pin link and the pivot link is offset toward the handle from an axis extending between a connection point between the frame and the pivot link and a connection point between the pin link and the pin in the over-center configuration.

2. The latch mechanism of claim 1, further comprising a pin-travel guide including a slider coupled to the pin and a slot formed in the frame, the slider extending into the slot, wherein the pin-travel guide is configured to support the pin against skewing relative to the frame during movement between the extended and retracted positions.

3. The latch mechanism of claim 1, a flange coupled to the shaft is sized to block the pin from passing completely through the collar.

4. The latch mechanism of claim 3, wherein the mount defines a bore and the collar is received in the bore, and wherein an exterior of the collar and an interior of the bore are formed to define threads for adjustable engagement of the collar with the mount.

5. The latch mechanism of claim 3, wherein the pre-load adjustment mechanism further includes a spring and a washer, wherein the spring is engaged with the collar and the washer is engaged with the spring, and wherein the flange of the pin engages with the washer and forces the washer toward the collar against a bias of the spring in response to movement of the pin from the retracted position to the extended position to place the pre-load through the linkage.

6. The latch mechanism of claim 1, further comprising a handle connector coupled between the pivot link and the handle, wherein rotation of the handle moves the handle connector to rotate the pivot link relative to the frame to move the pin link and pin relative to the frame.

7. The latch mechanism of claim 1, wherein a first projection extends from the pin link away from the connection point between the pin link and the pivot link, a second projection extends from the pivot link away from the connection point between the pin link and the pivot link, wherein the first and second projections engage with one another in response to movement of the pin from the retracted position to the extended position to place the pre-load through the linkage, and wherein the first and second projections are spaced apart from one another in the retracted position.

8. A latch mechanism for selectively blocking movement of a first component relative to a second component, the latch mechanism comprising:
   a frame coupled to the first component for movement therewith;
   a handle coupled to the frame for rotation relative to the frame;
   a linkage coupled to the handle and the frame;
   a pin coupled to the linkage; and
   a pre-load adjustment mechanism coupled to the frame,
   wherein the linkage is configured to convert rotation of the handle into axial movement of the pin relative to the pre-load adjustment mechanism between an extended position and a retracted position, the pin extends from the frame and engages with the first and second components in the extended position to block movement of the first component relative to the second component and is spaced apart from the second component in the retracted position to allow movement of the first component relative to the second component, and the pre-load adjustment mechanism is configured to engage with the pin in the extended position to place a pre-load through the linkage to bias the linkage toward an over-center configuration and bias the pin toward the extended position, and
   wherein the pre-load adjustment mechanism includes a mount coupled to the frame and a collar coupled to the mount, wherein a shaft of the pin is sized to extend through the mount and the collar, and wherein the collar is movable relative to the mount at the selection of a user to adjust an amount of pre-load through the linkage when the pin is in the extended position, and
   wherein the linkage includes a pivot link coupled to the frame for rotation relative to the frame, a pin link coupled between the pivot link and the pin, and a connection point between the pin link and the pivot link is offset toward the handle from an axis extending between a connection point between the frame and the pivot link and a connection point between the pin link and the pin in the over-center configuration.

9. The latch mechanism of claim 8, further comprising a pin-travel guide including a slider coupled to the pin and a slot formed in the frame, the slider extending into the slot, wherein the pin-travel guide is configured to support the pin against skewing relative to the frame during movement between the extended and retracted positions.

10. The latch mechanism of claim 8, a flange coupled to the shaft is sized to block the pin from passing completely through the collar.

11. The latch mechanism of claim 10, wherein the mount defines a bore and the collar is received in the bore, and wherein an exterior of the collar and an interior of the bore are formed to define threads for adjustable engagement of the collar with the mount.

12. The latch mechanism of claim 10, wherein the pre-load adjustment mechanism further includes a spring and a washer, wherein the spring is engaged with the collar and the washer is engaged with the spring, and wherein the flange of the pin engages with the washer and forces the washer toward the collar against a bias of the spring in response to movement of the pin from the retracted position to the extended position to place the pre-load through the linkage.

13. The latch mechanism of claim 8, further comprising a handle connector coupled between the pivot link and the handle, wherein rotation of the handle moves the handle connector to rotate the pivot link relative to the frame to move the pin link and pin relative to the frame.

14. The latch mechanism of claim 8, wherein a first projection extends from the pin link away from the connection point between the pin link and the pivot link, a second projection extends from the pivot link away from the connection point between the pin link and the pivot link, wherein the first and second projections engage with one another in response to movement of the pin from the retracted position to the extended position to place the pre-load through the linkage, and wherein the first and second projections are spaced apart from one another in the retracted position.

15. A latch mechanism comprising:
   a frame;
   a handle coupled to the frame for rotation relative to the frame;
   a linkage coupled to the handle and the frame;
   a pin coupled to the linkage;
   a pre-load adjustment mechanism coupled to the frame, the pre-load adjustment mechanism including a mount coupled to the frame and a collar coupled to the mount; and
   a pin-travel guide including a slider coupled to the pin and a slot formed in the frame, the slider extending into the slot,
   wherein the linkage is configured to convert rotation of the handle into axial movement of the pin relative to the pre-load adjustment mechanism between an extended position and a retracted position, the pin extends from the frame in the extended position, the pin-travel guide is configured to support the pin against skewing relative to the frame during movement between the extended and retracted positions, a shaft of the pin is sized to extend through the mount and the collar and a flange coupled to the shaft is sized to block the pin from passing completely through the collar, the pre-load adjustment mechanism is configured to engage with the pin in the extended position to place a pre-load through the linkage to bias the linkage toward an over-center configuration and bias the pin toward the extended position, and the collar is movable relative to the mount at the selection of a user to adjust an amount of pre-load through the linkage, and
   wherein the linkage includes a pivot link coupled to the frame for rotation relative to the frame, a pin link coupled between the pivot link and the pin, and a connection point between the pin link and the pivot link is offset toward the handle from an axis extending between a connection point between the frame and the pivot link and a connection point between the pin link and the pin in the over-center configuration.

16. The latch mechanism of claim 15, wherein the mount defines a bore and the collar is received in the bore, and wherein an exterior of the collar and an interior of the bore are formed to define threads for adjustable engagement of the collar with the mount.

17. The latch mechanism of claim 15, wherein the pre-load adjustment mechanism further includes a spring and a washer, wherein the spring is engaged with the collar and the washer is engaged with the spring, and wherein the flange of the pin engages with the washer and forces the washer toward the collar against a bias of the spring in response to movement of the pin from the retracted position to the extended position to place the pre-load through the linkage.

18. The latch mechanism of claim 15, further comprising a handle connector coupled between the pivot link and the handle, wherein rotation of the handle moves the handle connector to rotate the pivot link relative to the frame to move the pin link and pin relative to the frame.

19. The latch mechanism of claim 15, wherein a first projection extends from the pin link away from the connection point between the pin link and the pivot link, a second projection extends from the pivot link away from the connection point between the pin link and the pivot link, wherein the first and second projections engage with one another in response to movement of the pin from the retracted position to the extended position to place the pre-load through the linkage, and wherein the first and second projections are spaced apart from one another in the retracted position.

* * * * *